United States Patent
Gupta et al.

(10) Patent No.: US 7,493,955 B2
(45) Date of Patent: *Feb. 24, 2009

(54) WELL TREATING COMPOSITIONS FOR SLOW RELEASE OF TREATMENT AGENTS AND METHODS OF USING THE SAME

(75) Inventors: D. V. Satyanarayana Gupta, The Woodlands, TX (US); Joseph Walter Kirk, The Woodlands, TX (US)

(73) Assignee: BJ Services Company, Houston, TX (US)

(*) Notice: Subject to any disclaimer, the term of this patent is extended or adjusted under 35 U.S.C. 154(b) by 143 days.

This patent is subject to a terminal disclaimer.

(21) Appl. No.: 11/297,852

(22) Filed: Dec. 8, 2005

(65) Prior Publication Data

US 2006/0124302 A1    Jun. 15, 2006

Related U.S. Application Data

(63) Continuation-in-part of application No. 11/012,887, filed on Dec. 15, 2004.

(51) Int. Cl.
  *E21B 41/00*   (2006.01)
  *E21B 37/06*   (2006.01)
  *E21B 43/26*   (2006.01)
  *E21B 43/27*   (2006.01)
  *C09K 8/536*   (2006.01)

(52) U.S. Cl. .................. 166/279; 166/304; 166/307; 166/308.2; 166/308.3; 166/310; 507/204; 507/269; 507/902

(58) Field of Classification Search .............. None
See application file for complete search history.

(56) References Cited

U.S. PATENT DOCUMENTS

| | | | |
|---|---|---|---|
| 1,570,537 A * | 1/1926 | Teitsworth | ............... 502/405 |
| 3,179,170 A * | 4/1965 | Burtch et al. | ............... 507/242 |
| 3,850,248 A | 11/1974 | Carney | |
| 4,108,779 A | 8/1978 | Carney | |
| 4,552,591 A | 11/1985 | Millar | |

(Continued)

FOREIGN PATENT DOCUMENTS

| CA | 1262507 | 10/1989 |
|---|---|---|
| WO | WO 99/54592 | 10/1999 |
| WO | WO 2005/017313 A1 | 2/2005 |

OTHER PUBLICATIONS

P.J.C. Webb AEA Technology PLC, T.A., et al; Revolutionary New Chemical Delivery System for Fractured, Gravel Packed and Prepacked Screen Wells; SPE 38164; 1997.

P.J.C. Webb AEA Technology PLC, T.A., et al; Economic and Technical Advantages of Revolutionary New Delivery System for Fractured and Gravel Packed Wells; SPE 38548; 1997.

(Continued)

*Primary Examiner*—George Suchfield
(74) *Attorney, Agent, or Firm*—Jones & Smith, LLP; John Wilson Jones

(57) ABSTRACT

A composite of a well treatment agent adsorbed onto a water-insoluble adsorbent is useful in the treatment of oil and gas wells and may be introduced, as a well treatment fluid, with a carrier fluid. The water-insoluble adsorbent may be activated carbon, silica particulate, precipitated silica, zeolite, diatomaceous earth, ground walnut shells, fuller's earth and organic synthetic high molecular weight water-insoluble adsorbents. Suitable as the well treatment agent are scale inhibitors, corrosion inhibitors, paraffin inhibitors, salt inhibitors, gas hydrate inhibitors, asphaltene inhibitors, oxygen scavengers, biocides, foaming agent, emulsion breakers and surfactants.

15 Claims, 1 Drawing Sheet

U.S. PATENT DOCUMENTS

| | | | |
|---|---|---|---|
| 4,738,897 A | 4/1988 | McDougall et al. |
| 4,986,353 A | 1/1991 | Clark et al. |
| 5,102,558 A | 4/1992 | McDougall et al. |
| 5,741,758 A | 4/1998 | Pakulski |
| 5,758,725 A | 6/1998 | Streetman |
| 5,893,416 A | 4/1999 | Read |
| 5,922,652 A | 7/1999 | Kowalski et al. |
| 5,964,291 A | 10/1999 | Bourne et al. |
| 6,025,302 A | 2/2000 | Pakulski |
| 6,209,643 B1 | 4/2001 | Nguyen et al. |
| 6,209,646 B1 | 4/2001 | Reddy et al. |
| 6,279,656 B1 | 8/2001 | Sinclair et al. |
| 6,326,335 B1 | 12/2001 | Kowalski et al. |
| 6,331,508 B1 | 12/2001 | Pakulski |
| 6,380,136 B1 | 4/2002 | Bates et al. |
| 6,439,310 B1 | 8/2002 | Scott, III et al. |
| 6,527,051 B1 * | 3/2003 | Reddy et al. ................ 166/300 |
| 6,723,683 B2 | 4/2004 | Crossman et al. |
| 6,866,797 B1 | 3/2005 | Martin et al. |
| 2002/0128157 A1 | 9/2002 | Bates et al. |
| 2004/0060702 A1 | 4/2004 | Kotlar et al. |
| 2006/0065396 A1 | 3/2006 | Dawson et al. |

OTHER PUBLICATIONS

P.J.C. Webb AEA Technology PLC, T.A., et al; Economic and Technical Features of a Revolutionary Chemical Scale Inhibitor Delivery Method for Fractured and Gravel Packed Wells: Comparative Analysis of Onshore and Offshore Subsea Applications; SPE 39451; 1998.

Norris, et al; Maintaining Fracture Performance Through Active Scale Control; SPE 68300; 2001.

Norris, et al; Hyrdraulic Fracturing for Reservoir Management Production Enhancement, Scale Control and Asphaltine Prevention; SPE 71655; 2001.

McIninch, et al; New Relationship Between Oil Company and Service Company Rejuvenates a Mature north Sea Gas Field ; SPE 78327; 2002.

* cited by examiner

WELL TREATING COMPOSITIONS FOR SLOW RELEASE OF TREATMENT AGENTS AND METHODS OF USING THE SAME

This application is a continuation-in-part application of U.S. patent application Ser. No. 11/012,887, filed on Dec. 15, 2004.

FIELD OF THE INVENTION

The invention relates to composites for use in oilfield applications and methods of using the same, the composites being capable of slowly releasing well treatment agents adsorbed thereto.

BACKGROUND OF THE INVENTION

Oilfield fluids (e.g., oil, gas, and water) are generally complex mixtures of aliphatic hydrocarbons, aromatics, heteroatomic molecules, anionic and cationic salts, acids, sands, silts, clays and a vast array of other components. The nature of these fluids combined with the severe conditions of heat, pressure, and turbulence to which they are often subjected during retrieval, are contributory factors to scale formation, salt formation, paraffin deposition, emulsification (both water-in-oil and oil-in-water), gas hydrate formation, corrosion, asphaltene precipitation and paraffin formation in oil and/or gas production wells and surface equipment. Such conditions, in turn, decrease permeability of the subterranean formation, reduce well productivity and shorten the lifetime of production equipment. In order to clean scales from wells and equipment it is necessary to stop the production which is both time-consuming and costly.

Well treatment agents are often used in production wells to prevent the deleterious effects caused by such formations and precipitates. For instance, scaling in the formation and/or in the production lines downhole and at the surface is often controlled by the use of scale inhibitors.

Several methods are known in the art for introducing well treatment agents into production wells. For instance, a liquid well treatment agent may be forced into the formation by application of hydraulic pressure from the surface which forces the treatment agent into the targeted zone. In most cases, such treatments are performed at downhole injection pressures below that of the formation fracture pressure. Alternatively, the delivery method may consist of placing a solid well treatment agent into the producing formation in conjunction with a hydraulic fracturing operation. This method is often preferred because it places the treatment agent in contact with the fluids contained in the formation before such fluids enter the wellbore where deleterious effects are commonly encountered.

A principal disadvantage of such prior art methods is the difficulty in releasing the well treatment agent into the well over a sustained period of time. As a result, treatments must repeatedly be undertaken to ensure that the requisite level of treatment agent is continuously present in the well. Such treatments result in lost production revenue due to downtime.

Treatment methods are therefore sought for introducing well treatment agents into oil and/or gas wells wherein the treatment agent may be released over a sustained period of time. It is desired that such methods not require continuous attention of operators over prolonged periods.

SUMMARY OF THE INVENTION

The invention relates to composites having a well treatment agent adsorbed onto a water-insoluble adsorbent and to well treatment compositions comprising such composites.

Suitable well treatment agents include those capable of addressing the undesired effects caused by scale formations, salt formations, paraffin deposition, emulsification (both water-in-oil and oil-in-water), gas hydrate formation, corrosion, asphaltene precipitation, and paraffin formation. Further, other suitable treatment agents include foaming agents, oxygen scavengers, biocides and surfactants as well as other agents wherein slow release into the production well is desired.

In a preferred embodiment, the well treatment agent is a scale inhibitor selected from the group consisting of phosphates, phosphate esters, phosphoric acid, phosphonates, phosphonic acid, polyacrylamides, salts of acrylamido-methyl propane sulfonate/acrylic acid copolymers (AMPS/AA), phosphinated maleic copolymers (PHOS/MA), salts of a polymaleic acid/acrylic acid/acrylamido-methyl propane sulfonate terpolymer (PMA/AMPS) or mixtures thereof.

The water-insoluble adsorbent is preferably activated carbon, silica particulate, precipitated silica, zeolite, diatomaceous earth, ground walnut shells, fuller's earth and organic synthetic high molecular weight water-insoluble adsorbents.

The amount of well treatment agent in the well treating composite may be as low as 1 ppm.

The well treating composite may be used to prevent and/or control the formation of deposits in a production well. In addition, the well treating composite may be used to control the rate of release of well treating agents in a production well.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

Figure 1:
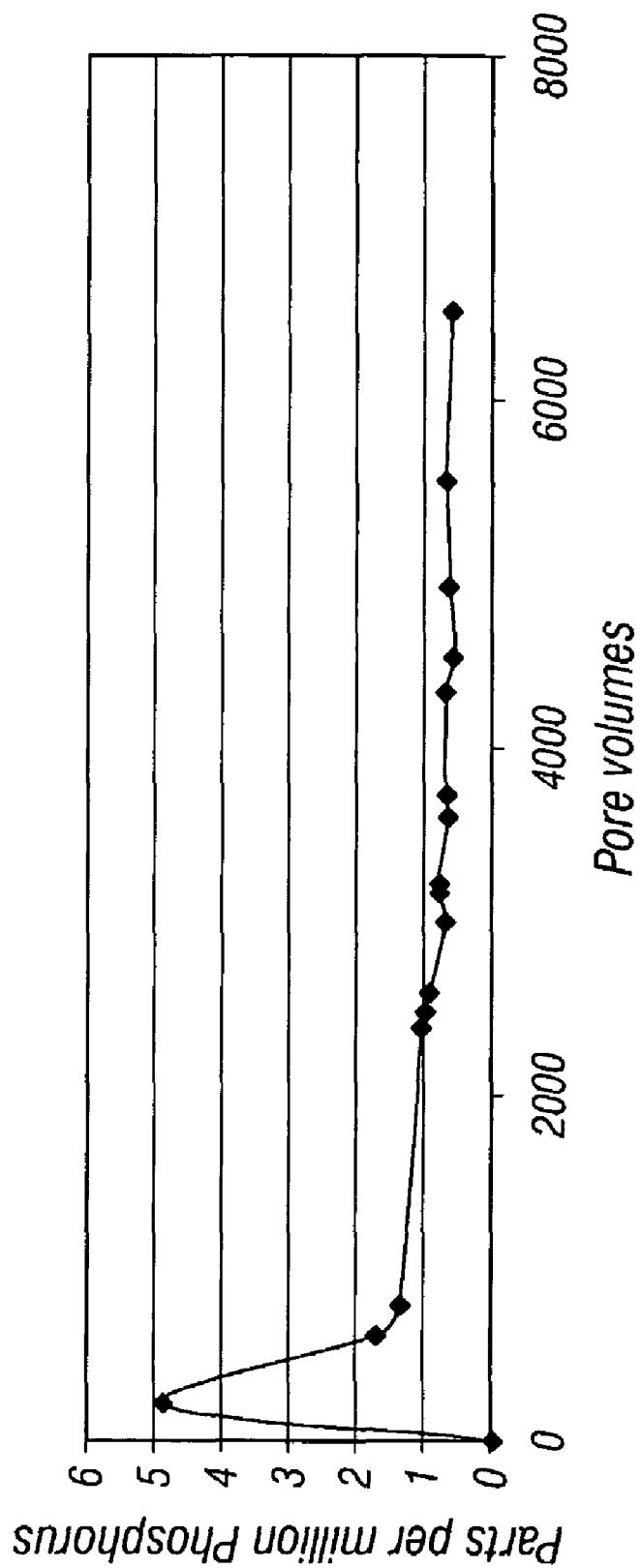
FIG. 1 illustrates the effectiveness of the composite of the invention in a packed sand column.

The composite of the invention contains a well treatment agent adsorbed onto a water-insoluble adsorbent. The well treatment agent may be slowly released from the composite upon introduction into a targeted area. The composite of the invention therefore permits a continuous supply of the well treatment agent into the targeted area.

In a preferred embodiment, the well treatment agent may be at least one member selected from the group consisting of demulsifying agents (both water-in-oil or oil-in-water), corrosion inhibitors, scale inhibitors, paraffin inhibitors, gas hydrate inhibitors, salt formation inhibitors and asphaltene dispersants.

Further, other suitable treatment agents include foaming agents, oxygen scavengers, biocides and surfactants as well as other agents wherein slow release into the production well is desired.

Adsorption of the well treatment agent onto the adsorbent reduces (or eliminates) the amount of well treatment agent required to be in solution. Since the well treatment agent is adsorbed onto a substrate, only a small amount of well treatment agent may be released into the aqueous medium.

The well treatment agent is preferably a liquid material. If the well treatment agent is a solid, it can be dissolved in a suitable solvent, thus making it a liquid.

In a preferred embodiment, the well treating composite of the invention effectively inhibits controls, prevents or treats the formation of inorganic scale formations being deposited in subterranean formations, such as oil wells, gas wells and wellbores. The composites of the invention are particularly efficacious in the treatment of scales of calcium, barium, magnesium salts and the like, including barium sulfate, calcium sulfate, and calcium carbonate scales. The composites may further have applicability in the treatment of other inorganic scales, such as zinc sulfide, iron sulfide, etc.

Suitable scale inhibitors include strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof.

Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale inhibitors. Sodium salts are preferred.

Further useful, especially for brines, are chelating agents, including diethylenetriaminepentamethylene phosphonic acid and ethylenediaminetetra acetic acid.

Exemplary of the demulsifying agents that are useful include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of the such di-functional products. Especially preferred as non-ionic demulsifiers are oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide etc.

Paraffin inhibitors useful for the practice of the present invention include, but are not limited to, ethylene/vinyl acetate copolymers, acrylates (such as polyacrylate esters and methacrylate esters of fatty alcohols), and olefin/maleic esters.

Exemplary corrosion inhibitors useful for the practice of the invention include but are not limited to fatty imidazolines, alkyl pyridines, alkyl pyridine quaternaries, fatty amine quaternaries and phosphate salts of fatty imidazolines.

Gas hydrate treating chemicals or inhibitors that are useful for the practice of the present invention include but are not limited to polymers and homopolymers and copolymers of vinyl pyrrolidone, vinyl caprolactam.

Exemplary asphaltene treating chemicals include but are not limited to fatty ester homopolymers and copolymers (such as fatty esters of acrylic and methacrylic acid polymers and copolymers) and sorbitan monooleate.

Suitable foaming agents include, but are not limited to, oxyalkylated sulfates or ethoxylated alcohol sulfates, or mixtures thereof.

Exemplary surfactants include cationic, amphoteric, anionic and nonionic surfactants. Included as cationic surfactants are those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable surfactants containing a quaternary group include quaternary ammonium halide or quaternary amine, such as quaternary ammonium chloride or a quaternary ammonium bromide. Included as amphoteric surfactants are glycinates, amphoacetates, propionates, betaines and mixtures thereof. The cationic or amphoteric surfactant may have a hydrophobic tail (which may be saturated or unsaturated) such as a $C_{12}$-$C_{18}$ carbon chain length. Further, the hydrophobic tail may be obtained from a natural oil from plants such as one or more of coconut oil, rapeseed oil and palm oil.

Preferred surfactants include N,N,N trimethyl-1-octadecammonium chloride: N,N,N trimethyl-1-hexadecammonium chloride; and N,N,N trimethyl-1-soyaammonium chloride, and mixtures thereof. Suitable anionic surfactants are sulfonates (like sodium xylene sulfonate and sodium naphthalene sulfonate), phosphonates, ethoxysulfates and mixtures thereof.

Exemplary oxygen scavengers include triazines, maleimides, formaldehydes, amines, carboxamides, alkylcarboxylazo compounds cumine-peroxide compounds morpholino and amino derivatives morpholine and piperazine derivatives, amine oxides, alkanolamines, aliphatic and aromatic polyamines.

The composite of the invention does not require excessive amounts of well treatment agents. The amount of well treatment agent in the composite is that amount sufficient to effectuate the desired result over a sustained period of time. Generally, the amount of well treatment agent in the composite is from about 0.05 to about 5 (preferably from about 0.1 to about 2) weight percent based upon the total weight of the composite.

For instance, where the well treatment agent is a scale inhibitor, the amount of scale inhibitor present in the composite is that amount required to prevent, or to at least substantially reduce the degree of, scale formation. For most applications, the amount of scale inhibitor in the well treating composite may be as low as 1 ppm. Such small amounts of scale inhibitor may be sufficient for up to 1,000 pore volumes and typically provides up to six months of continuous inhibition. Costs of operation are therefore significantly lowered.

The water insoluble adsorbent may be any of various kinds of commercially available high surface area materials having the affinity to adsorb the desired well treatment agent. Typically, the surface area of the adsorbent of the well treating composite is between from about 1 $m^2/g$ to about 100 $m^2/g$.

Suitable adsorbents include finely divided minerals, fibers, ground almond shells, ground walnut shells, and ground coconut shells. Further suitable water-insoluble adsorbents include activated carbon and/or coals, silica particulates, precipitated silicas, silica (quartz sand), alumina, silica-alumina such as silica gel, mica, silicate, e.g., orthosilicates or metasilicates, calcium silicate, sand (e.g., 20-40 mesh), bauxite, kaolin, talc, zirconia, boron and glass, including glass microspheres or beads, fly ash, zeolites, diatomaceous earth, ground walnut shells, fuller's earth and organic synthetic high molecular weight water-insoluble adsorbents. Particularly preferred are diatomaceous earth and ground walnut shells.

Further useful as adsorbents are clays such as natural clays, preferably those having a relatively large negatively charged surface, and a much smaller surface that is positively charged.

Other examples of such high surface area materials include such clays as bentonite, illite, montmorillonite and synthetic clays.

The weight ratio of well treatment agent to water-insoluble adsorbent is generally between from about 90:10 to about 10:90.

The adsorption of the liquid (or solution of) well treatment agent onto the solid adsorbent limits the availability of the free well treatment agent in water. In addition, the composite itself has limited solubility in water. When placed into a production well, the well treatment agent slowly dissolves at a generally constant rate over an extended period of time in the water which is contained in the formation. The controlled slow release of the agent is dependent upon the surface charges between the well treatment agent and adsorbent which, in turn, is dependent upon the adsorption/desorption properties of the agent to adsorbent.

Generally, the lifetime of a single treatment using the composite of the invention is between six and twelve months depending upon the volume of water produced in the production well and the amount of well treatment agent bound to the water-insoluble adsorbent.

Well treating compositions in accordance with the invention include the composite. The carrier fluid may be a brine, salt water, fresh water, a liquid hydrocarbon, or a gas such as nitrogen or carbon dioxide. Suitable compositions include fracturing fluids, completion fluids, acidizing compositions, etc. The amount of composite present in the well treating composition is typically between from about 15 ppm to about 100,000 ppm depending upon the severity of the scale deposition. When the carrier fluid is brine, the weight percentage of the composite in the composition is generally between from about 0.02 to about 2 weight percent.

The composition may further contain between from 0 to about 10 weight percent of an inorganic salt. Suitable inorganic salts include KCl, NaCl, and $NH_4Cl$.

The well treating composition may be used to control and/or prevent the undesired formation of scales, salts, paraffins, gas hydrates, asphaltenes as well as corrosion in formations or on surface equipment. Further, other suitable treatment agents include foaming agents, oxygen scavengers, biocides, emulsifiers (both water-in-oil and oil-in-water) and surfactants as well as other agents may be employed with the adsorbent when it is desired to slowly slow release such agents into the production well.

The well treating composition of the invention may be used in stimulation treatments as a component of a fracturing fluid or acidizing fluid, such as a matrix acidizing fluid. The composite has particular applicability in completion fluids containing zinc bromide, calcium bromide calcium chloride and sodium bromide brines. Such fluids may be introduced down the annulus of the well and, when desired, flushed with produced water.

In a particularly preferred embodiment, the composites of the invention are used in fluids used for the treatment of gas wells or oils wells wherein it is desired to inhibit the formation of scales, control the formation of scales or retard the release of scale inhibitors into the well. For instance, the composite may be used in completion or production services. The composites of the invention may be used in the well to remove scales from or control the formation of scales onto tubular surface equipment within the wellbore.

The following examples will illustrate the practice of the present invention in a preferred embodiment. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

EXAMPLES

Preparation of Scale Inhibitor Composite. About 800 g of 10/50 mesh diatomaceous earth (Celite MP-79) absorbent was added into a mixing bowl. A paddle mixer blade was attached and liquid organophosphate (Solutia Dequest 2000) was added to the mixing bowl at a rate in which the liquid was readily absorbed, and the liquid did not puddle. After all of the liquid was added, mixing was continued until a homogenous blend was produced. The blend was then dried at 225 F until the percent moisture of the resulting product was less than 3%. The composite thus prepared contained 25 percent by weight of organophosphate scale inhibitor.

Evaluation of Scale Inhibitor Composite. A length of ½" PVC pipe, 30" in length was fitted with provisions to attach tubing to each end such that water or other fluids could be injected at one end and injected fluids exit at the other end. The column was filled with 225 g of 20/40 mesh Ottawa White sand containing 3.54 g of the composite. The sand and composite were intimately mixed so as to disperse the composite product throughout the entire sand column. The amount of tap water (maintained at 74° F.) required to fill the void spaces in the sand column was 53 ml. Thus, the pore volume of the test column was 53 ml. A peristaltic pump was employed to pump water into the bottom of the column at the rate of 10 ml/min. The effluent from the top of the column was collected periodically and analyzed for the presence of phosphorus ion by ion chromatography. The phosphorus levels were then plotted against pore volume as set forth in FIG. 1. As illustrated, the phosphorus level in the first few pore volumes was in the range of 5 ppm but rapidly fell to 1 ppm and remained at approximately 1 ppm for an extended period of time. The 1 ppm level was sufficient to prevent the formation of scales and indicates the ability of the scale inhibitor composite to render long term protection.

From the foregoing, it will be observed that numerous variations and modifications may be effected without departing from the true spirit and scope of the novel concepts of the invention.

What is claimed is:

1. A method of stimulating a subterranean formation which comprises pumping into the formation, in a single step, a fracturing or acidizing fluid comprising a composite of a well treatment agent adsorbed onto a water-insoluble adsorbent wherein the well treatment agent is dissolved at a generally constant rate over an extended period of time in the water which is contained in the formation, wherein the surface area of the adsorbent is between from about 1 $m^2/g$ to about 100 $m^2/g$, the weight ratio of the well treatment agent to adsorbent in the composite is between from about 9:1 to about 1:9 and the lifetime of the composite introduced in the single treatment step is at least six months.

2. The method of claim 1, wherein the well treatment agent is at least one member selected from the group consisting of corrosion inhibitors, paraffin inhibitors, salt inhibitors, gas hydrate inhibitors, asphaltene inhibitors, oxygen scavengers, biocides, foaming agent, emulsion breakers and surfactants.

3. The method of claim 1, wherein the amount of well treatment agent in the composite is between from about 0.05 to about 5 weight percent.

4. The method of claim 3, wherein the amount of well treatment agent in the composite is between from about 0.1 to about 2 weight percent.

5. The method of claim 1, wherein the water-insoluble adsorbent is selected from the group consisting of activated carbon, silica particulate, precipitated silica, zeolite, diatomaceous earth, ground walnut shells, fuller's earth and organic synthetic high molecular weight water-insoluble adsorbents.

6. The method of claim 5, wherein the water-insoluble adsorbent is diatomaceous earth or ground walnut shells.

7. The method of claim 1, wherein the amount of composite in the fracturing or acidizing fluid is between from about 15 ppm to about 100,000 ppm.

8. A method of controlling the rate of release of a well treatment agent in a wellbore comprising introducing into the wellbore a well treating composition comprising a composite of a well treatment agent adsorbed onto a water-insoluble adsorbent having a surface area of from about 1 $m^2/g$ to about 100 $m^2/g$, wherein the weight ratio of well treatment agent to adsorbent in the composite is between from about 9:1 to about 1:9 and further wherein the composite has a lifetime, from a single treatment, of at least six months.

9. The method of claim 8, wherein the well treating composition further comprises a carrier fluid.

10. The method of claim 8 wherein the water-insoluble adsorbent is selected from the group consisting of activated carbon, silica particulate, precipitated silica, zeolite, diatomaceous earth, ground walnut shells, fuller's earth and organic synthetic high molecular weight water-insoluble adsorbents.

11. The method of claim 8, wherein the well treatment agent is at least one member selected from the group consisting of corrosion inhibitors, paraffin inhibitors, salt inhibitors, gas hydrate inhibitors, asphaltene inhibitors, oxygen scavengers, biocides, foaming agent, emulsion breakers and surfactants.

12. The method of claim 8, wherein the amount of well treatment agent in the composite is between from about 0.05 to about 5 weight percent.

13. The method of claim 12, wherein the amount of well treatment agent in the composite is between from about 0.1 to about 2 weight percent.

14. A method of inhibiting or controlling the rate of release of a well treatment agent in a subterranean formation or in a wellbore by introducing into the formation or wellbore a composite of a well treatment agent adsorbed onto a water-insoluble adsorbent, wherein the adsorbent has a surface area of from about 1 $m^2/g$ to about 100 $m^2/g$ and further wherein the weight ratio of well treatment agent to adsorbent in the composite is between from about 9:1 to about 1:9, the composite having a lifetime, from a single treatment, of at least six months.

15. The method of claim 14, wherein the well treatment agent is at least one member selected from the group consisting of corrosion inhibitors, paraffin inhibitors, salt inhibitors, gas hydrate inhibitors, asphaltene inhibitors, oxygen scavengers, biocides, foaming agent, emulsion breakers and surfactants.

* * * * *